United States Patent Office 3,567,734
Patented Mar. 2, 1971

3,567,734
QUATERNARY IMIDAZOLINIUM SALTS
Keith Liddell Johnson, Matteson, Ill., assignor to
Swift & Company, Chicago, Ill.
No Drawing. Filed Oct. 20, 1966, Ser. No. 587,997
Int. Cl. C07d *49/34;* C07c *87/30*
U.S. Cl. 260—309.6
2 Claims

ABSTRACT OF THE DISCLOSURE

Preparation of cationic detergents comprising quaternization of a tertiary nitrogen atom of a fatty amine or a fatty imidazoline with polyalkylene glycol halide. Alternatively, a detergent composition is prepared by quaternization of a tertiary amine with a polyalkylene glycol halide, the hydroxyl group of which has been reacted with an epoxy group or carboxylic acid group.

---

The present invention relates to cationic detergents and to their preparation, and more specifically to cationic detergents which exhibit utility over the entire pH spectrum.

During the past decade there has been increasing usage of cationic detergents in a variety of industrial and home applications. For example, cationic detergents now find utility in such diverse applications as antistatic agents for phonograph records, fluffing agents for fabrics, anticaking agents for powdered materials, fume depressants for volatile acid baths, emulsifiers in acid systems, agricultural emulsifiers, corrosion inhibitors, bacteriostats, and mold and fungus inhibitors, as well as a variety of other uses.

The utilization of cationic detergents in the above applications, as well as for other purposes, has been limited in the past by the tendency of the cationic detergent to precipitate if the pH of the material within which it is dispersed is altered to without a given pH range.

Attempts to overcome the above undesirable feature has resulted in the development of amphoteric materials which exhibit detergent properties under both acidic and alkaline conditions. Invariably, however, these materials will precipitate at their isoelectric point. Thus, although the undesirable feature of cationic detergents has been alleviated to some extent, it still exists even in the amphoteric detergents.

It is an object of the present invention to provide a new group of cationic detergents which will not precipitate at any pH, and which exhibit detergent properties over the entire pH spectrum.

It is another object of the present invention to provide a method for preparing cationic detergents which exhibit the aforesaid properties.

Additional objects of the present invention, if not set forth specifically herein, will be readily apparent to one skilled in the art from a following reading of the specification.

It has been discovered in the present invention that certain compounds having present therein a polyoxyalkylene chain attached to a quaterized nitrogen atom exhibit a nonionic character at higher pH values while acting as a cationic detergent in the lower pH range. By this dual nature the tendency to precipitate is eliminated.

The compositions of the present invention may be prepared by the quaternization of a nitrogen containing reactant with a polyalkylene glycol halide. As an alternative method, compositions suitable in the present invention may be prepared by the reaction of the hydroxyl group of the polyalkylene glycol halide with a reactant containing an epoxy or carboxylic acid group, followed by quaternization of the halide of the polyalkylene glycol halide with a tertiary amine.

The polyalkylene glycol halides used in the present invention generally contain a total from about 2 to about 10, and preferably, from about 3 to about 5, oxyethylene and/or oxypropylene units. Both the chlorides and bromides are suitable.

For the sake of convenience, the preferred reactant, polyethylene glycol chloride, is used in the following examples.

Part I of the following description discloses the preparation of the present compositions by the reaction of polyethylene glycol chloride with a material which contains a quaternizable nitrogen atom.

Part II deals with the reaction of polyethylene glycol chloride with epoxidized substrates and reactants containing a carboxyl group, followed by quaternization of the resultant intermediate with a tertiary amine.

It will be understood, of course, that the examples set forth herein are merely illustrative of the present invention and are not restrictive thereof.

PART I

This embodiment illustrates the reaction of polyethylene glycol chloride with a hydrophobic nitrogen containing molecule having a molecular weight in excess of 200 by quaternization of the nitrogen atom of said molecule.

Generally, the reaction is conducted by agitation of the reactants in a suitable reaction vessel at a temperature of generally about 70 to about 160° C. for a period of from about 20 to about 200 minutes. Preferably, the reaction is conducted at a temperature of from about 130 to about 140° C. for a period of from about 60 to about 90 minutes. It will be understood, of course, that a higher temperature will generally permit a shorter reaction period.

Generally, the hydrophobic reactant employed in this embodiment is selected from the group consisting of tertiary N-fatty, and N,N difatty amines and N-substituted fatty imidazolines, although other tertiary amino containing materials of fatty or petrochemical origin can be employed. Ordinarily, the fatty chains of the preceding materials will contain an average of 8-24 carbons, and preferably 12-18 carbons.

Imidazolinium chloride salts prepared by the quaternization of N-monosubstituted imidazolines are particularly valuable compounds prepared by this embodiment of the present invention. The following examples illustrate the preparation of these preferred compounds.

Example I

Two hundred eighty-two grams of oleic acid were reacted with 104 grams of N-aminoethylethanolamine at a temperature of 150° C. for 1 hour, after which the temperature was raised to 180° C. for an additional 2½ hours. Approximately 1 mole of water was evolved during the initial reaction period and a second mole was evolved during the balance of the reaction period.

The N-2-hydroxyethyloleylimidazoline prepared by the above reaction was then mixed with 400 grams of Polyethylene Glycol Chloride 410, a developmental product of the Dow Chemical Company. These materials were then agitated at approximately 130 to 140° C. for a period of 90 minutes, after which the reaction product was cooled to room temperature. The material obtained by this reaction was observed to have utility as an emulsifier for mineral oil, both in 3 molar hydrochloric acid and in 5% potassium hydroxide. Physically, the material was a yellow viscous liquid.

Example II

Two hundred-ten grams of a methyl ester of coconut fatty acids were reacted with 104 grams of anhydrous N-methylethylenediamine in the presence of 0.5% anhydrous sodium methylate for a period of 1 hour at 80° C. During the reaction, 32 milliliters of methyl alcohol were evolved. The reaction vessel was then heated to a temperature of 180° C. for a period of 2 additional hours, during which time one mole of water was evolved. Presumably, the initial reaction involved the formation of N-aminoethyl-N-methyl-laurylamine followed by cyclization and removal of the carbonyl oxygen to produce the N-methyl-laurylimidazoline.

The N-methyl-laurylimidazoline was then diluted to 50% activity with isopropyl alcohol and 220 grams of Polyethylene Glycol Chloride 210 was added to the blend which was subsequently refluxed for a 3-hour period. The isopropyl alcohol was then removed in a rotating type laboratory evaporator.

The resultant product exhibited a Ross Miles foam height of 220 millimeters at a concentration of 1.00% in distilled water. The foam height was qualitatively observed to remain consistently high throughout the acidic and alkaline pH ranges.

Example III 315 grams of Hystrene 9022, a saturated fatty acid reportedly 90% in the $C_{20}$ to $C_{22}$ range were reacted with 130 grams of N-aminoethylethanolamine for three hours at a temperature of 175° C.

The material thus obtained was then reacted with polyethylene glycol chloride prepared by reacting 8 moles of ethylene oxide with 1 mole of ethylene chlorohydrin for 1 hour at 130° C.

The material thus obtained possessed excellent utility as a fabric softening agent and did not possess the yellowing defects generally caused by build-up of the more hydrophobic fluffing agents.

The following example illustrates the reaction of a carboxylic acid with a hydroxyl amine to form an amine ester, followed by quaternization of the intermediate with a polyethylene glycol chloride.

Example IV 95 grams of N,N-dimethylethanolamine were reacted with 270 grams of commercial grade eutectic stearic acid at a temperature of 180° C. to produce the amine ester derivative of the stearic acid.

The ester derivative was then quaternized with Polyethylene Glycol Chloride 410. The resultant material exhibited utility as a foaming agent in acid medium and an emulsifying agent in alkaline medium.

PART II

Other compounds coming within the scope of the present invention may be prepared by the reaction of polyethylene glycol chloride with the epoxy group of epoxidized esters and triglycerides or with the carboxyl group of a fatty acid.

Generally speaking, the epoxidized esters and triglycerides have a molecular weight of from about 100 to about 2000, and preferably from about 300 to about 1000. Said materials contain an average of from about 1 to about 5 epoxy groups, and preferably an average of from about 1 to about 3 epoxy groups. Suitable epoxidized materials include methyl epoxy stearate, 2-ethyl hexyl epoxy stearate, epoxidized soybean oil, epoxidized tallow, and epoxidized lard.

The order of the reactions in Part II are not critical, and may even take place concurrently. However, caution should be exercised in the employment of concurrent reactions because of the corrosive nature of by-products which may be formed, particularly with the fatty acid reactants. In order to minimize corrosion and the formation of by-products, it is preferred that the reactions be conducted in order which follows.

The compounds of this embodiment are preferably prepared by initially reacting the polyethylene glycol chloride with the epoxidized material at ambient temperatures in the presence of Lewis acid catalysts or strong bases such as alkali metal alcoholates or amides in accordance with the prior art. Agitation of these materials under the aforesaid conditions results in the reaction of the epoxy group of the epoxidized material with the hydroxyl group of the polyethylene glycol chloride to form a hydroxyl group on said chain having a polyoxyethylene chain adjacent thereto.

The intermediate product formed by the above reaction is then combined with agitation with a tertiary amine and heated at from about 70 to about 180° C. for from about 20 to about 200 minutes, and preferably at 130 to about 140° C. for from about 60 to about 90 minutes, resulting in a quaternization reaction between the tertiary amine and the chloride of the intermediate product.

The tertiary amine reactant employed in this embodiment will contain three alkyl and/or alkoxy chains of from about 1 to about 6, and preferably from about 1 to about 2 carbon atoms, respectively. The tertiary amine should contain a total of from about 3 to about 12 carbon atoms, and preferably a total of from about 3 to about 9 carbon atoms. Preferred tertiary amines include trimethyl amine, dimethyl ethanolamine, triethyl amine, triethanolamine, methyl diethanolamine, and triallylamine.

The following example illustrates the reaction of polyethylene glycol chloride with an epoxidized ester:

Example V

Three hundred fifteen grams of methyl epoxy stearate were reacted with 600 grams of polyethylene glycol chloride having a molecular weight of approximately 600 and prepared by the condensation of ethylene oxide with ethylene chlorohydrin. The reaction was conducted in the presence of the dihydrate of boron trifluoride to produce the ether alcohol derivative of the epoxidized oil.

The material thus formed was subsequently reacted in a 20% refluxing solution of isopropyl alcohol in the presence of 0.5% potassium hydroxide as the catalyst with dimethyl ethanolamine. The resulting material was a viscous liquid and exhibited surface active properties as illustrated by its ability to lower the surface tension of water to a value of approximately 35 dynes per centimeter.

It will be quite apparent to one skilled in the art that a technique similar to that of Example V may be employed in the reaction of polyethylene glycol chloride with epoxidized triglycerides by a mere corresponding variation of proportions to compensate for the difference in molecular weight and number of epoxidized groups present.

As previously mentioned, suitable compounds may be prepared using a fatty acid instead of the aforesaid epoxidized material. In this alternative embodiment, a polyethylene glycol chloride is first reacted with the carboxyl group of a fatty acid, said fatty acid having generally an average of from about 10 to about 22 carbon atoms inclusive of the carboxyl group, and preferably from about 12 to about 18 carbon atoms. Suitable acids include lauric acid, soybean fatty acids and stearic acid.

The intermediate material formed in the preceding reaction is then agitated with a tertiary amine falling within the previous definition to yield the final product. This latter reaction is generally conducted at about 80 to about 200° C. for from about 20 to about 200 minutes, and preferably at about 130 to about 140° C. for from about 60 to about 90 minutes.

The following example illustrates the preceding reaction:

Example VI

Twenty-eight hundred pounds of tallow fatty acids, thirty pounds of stannic chloride and four thousand pounds of the 3 mol propylene oxide adduct of ethylene chlorohydrin were reacted in a 50% solution of refluxing xylene. The moisture was removed from the system as it collected in an azeotrope trap. After an eight-hour period no further significant amounts of water were noted. Fifteen hundred pounds of triethanolamine were then added and the mixture was allowed to cool slowly. The solvent was removed by passing through a thin film evaporator under reduced pressure (20–40 microns Hg abs.). This product was an effective emulsifier for aromatic solvents in brine over a wide pH range.

It will be readily apparent to one skilled in the art that mixtures of the various reactants may be utilized in the present invention, instead of the singular reactants given in the preceding examples.

Obviously many modifications and variations of the invention as hereinbefore set forth may be made without departing from the spirit and scope thereof, and therefore only such limitations should be imposed as are indicated in the appended claims.

I claim:

1. A quaternary imidazolinium salt prepared by mixing N-hydroxyethyl - 2-oleyl-2-imidazoline with a polyalkylene glycol halide containing 2–10 oxyalkylene units and selected from the group consisting of polyoxyethylene glycol halide and polyoxypropylene glycol halide, and thereafter heating the mixture at a temperature of from about 70° to about 160° C. for from about 20 to about 200 minutes.

2. A quaternary imidazolinium salt prepared by mixing N-methyl-2-lauryl - 2-imidazoline with a polyalkylene glycol halide containing 2–10 oxyalkylene units and selected from the group consisting of polyoxyethylene glycol halide and polyoxypropylene glycol halide, and thereafter heating the mixture at a temperature of from about 70° to about 160° C. for from about 20 to about 200 minutes.

References Cited
UNITED STATES PATENTS

| | | | |
|---|---|---|---|
| 2,096,749 | 10/1937 | Kritchevsky | 260—404 |
| 2,194,906 | 3/1940 | Krzikalla et al. | 260—404 |
| 2,211,001 | 8/1940 | Chwala | 260—309.6 |
| 2,775,604 | 12/1956 | Zech | 260—404 |
| 2,914,427 | 11/1959 | Valko et al. | 260—309.6 |
| 3,029,265 | 4/1962 | Zech | 260—404 |
| 3,060,182 | 10/1962 | Zech | 260—309.6 |
| 3,148,154 | 8/1964 | De Groote et al. | 260—309.6 |
| 3,251,852 | 5/1966 | De Groote et al. | 260—309.6 |
| 2,484,146 | 10/1949 | Barber et al. | 260—309.6 |

NATALIE TROUSOF, Primary Examiner

U.S. Cl. X.R.

252—8.8, 117, 152; 260—404, 404.5, 405.5, 407, 408